Patented June 10, 1941

2,245,342

UNITED STATES PATENT OFFICE 2,245,342

ELECTRIC CONTROL SYSTEM

Peder B. Hoye, Maywood, Ill., assignor to Electrical Engineers Equipment Co., Melrose Park, Ill., a corporation of Illinois Original application February 1, 1937, Serial No. 123,325. Divided and this application April 1, 1940, Serial No. 327,170

10 Claims. (Cl. 171—97)

My invention relates, generally, to electric control systems and it has particular relation to electric power transfer systems. This application is a division of my application, Serial No. 123,325, filed February 1, 1937.

In many industrial applications of electric power, the continuity of power supply is of utmost importance. In the event of a failure of the power supply, valuable time may be lost through the enforced shut-down of electrically driven machines and the like. Also, in some industries, such as those in which electric heating devices and electric furnaces are used, a failure of power supply may cause a loss in material being processed or such change in the material being processed as to render it worthless. In such installations, an auxiliary or emergency power circuit is provided to which the load circuit can be transferred on failure of the main or preferred power circuit. Therefore, an object of my invention is to provide for quickly and automatically transferring a load circuit from a preferred power circuit to an auxiliary power circuit on the occurrence of a fault, such as failure of power, on the preferred power circuit.

A further object of my invention is to provide for automatically transferring the load circuit back to the preferred power circuit as soon as the fault on it is removed.

Still another object of my invention is to interlock the control circuits of the circuit breakers employed to effect this transfer in such manner as to prevent the simultaneous closure thereof.

A further object of my invention is to interlock the holding or latching and cut-off devices of the circuit breakers in such manner as to prevent this simultaneous operation.

Where transfer circuit breakers are provided for connecting a load circuit to an auxiliary power circuit when the main or preferred power circuit fails, it may be desirable in some cases to interconnect the main and auxiliary power circuits. The auxiliary power circuit may form a part of a power system to which other load circuits may be connected. On failure of power on the auxiliary circuit, these load circuits are, of course, deenergized. However, they can be energized by simultaneously operating both of the circuit breakers which normally are employed for transferring the main load circuit from the main power circuit to the auxiliary power circuit. The reverse operation may also be true and it may be desirable to supply power to the main power circuit from the auxiliary power circuit by a simultaneous operation of both of these circuit breakers.

Thus, another object of my invention is to provide for automatically transferring a load circuit from a main to an auxiliary power circuit on failure of the main power circuit for example, and for interconnecting the two power circuits under certain operating conditions.

Other objects of my invention will, in part, be obvious and in part appear hereinafter.

My invention, accordingly, is disclosed in the embodiments thereof shown in the accompanying drawings, and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawings, in which.

Figure 1:
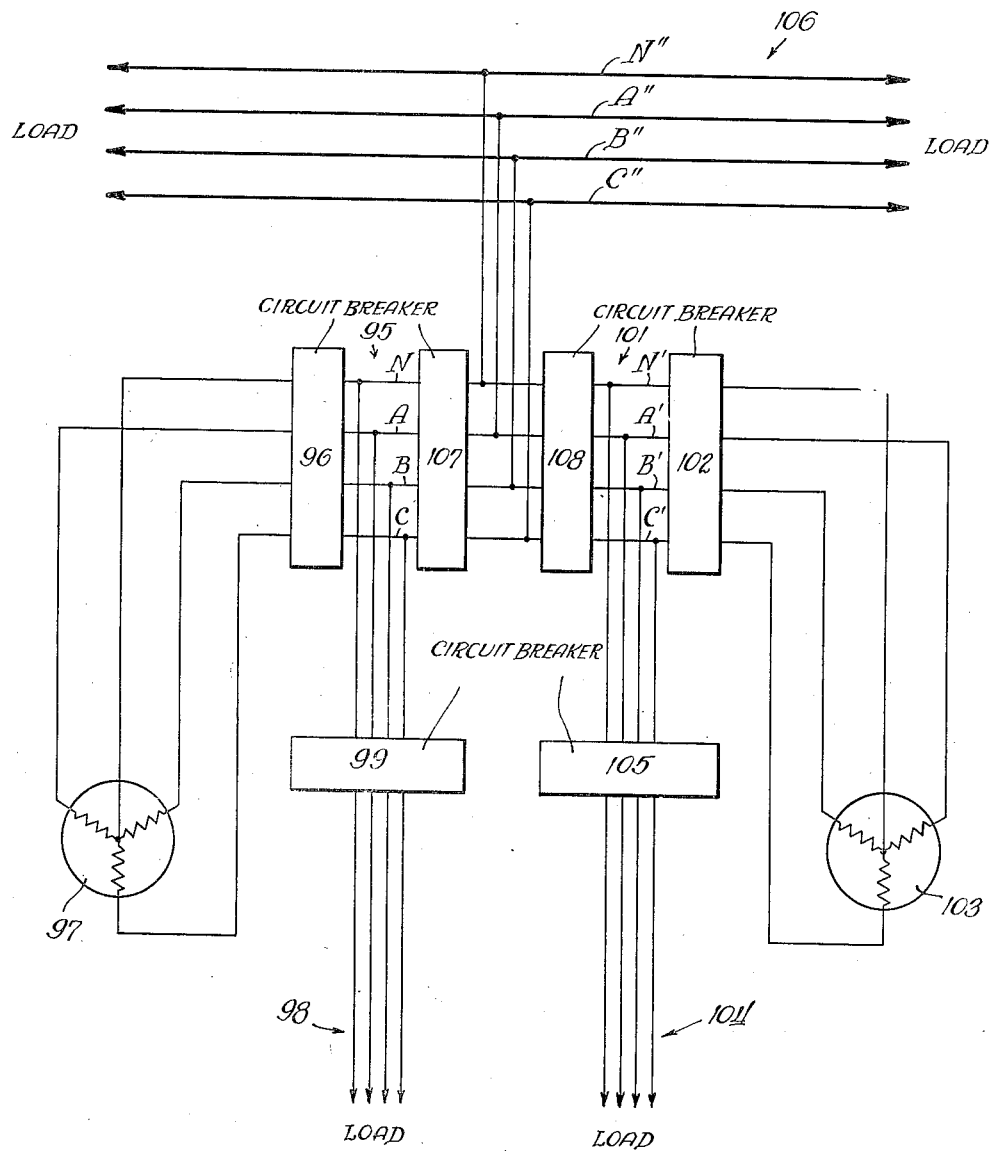
Figure 1 illustrates, diagrammatically, the general arrangement of my novel reclosing circuit breaker system and connections for simultaneously operating both of these circuit breakers to provide an interchange of power between the main and the auxiliary power circuits.

In my application referred to hereinbefore, of which this application is a division, I have disclosed how I provide for closing a circuit breaker through a suitable linkage by means of a torque motor that is arranged to operate through a partial revolution. It will be understood, however, that other suitable energy translating devices may be employed instead of a torque motor.

The torque motor is energized by operation of a suitable control relay which serves to connect it for energization to a suitable current source, such as a source of alternating current. The winding of the control relay is connected for energization through a winding on a core that has associated therewith an armature which is connected to the linkage and moves together with the movable contact members of the circuit breaker. When the circuit breaker is in the open position, the armature is positioned away from the core, and, therefore, the impedance of the winding thereon is relatively low. On energization of the relay winding and the winding on the core connected in series circuit relation therewith from a source of alternating current, the control relay is first operated to effect the energization of the torque motor. As the armature approaches the core, the impedance of the winding thereon increases until, at the time that the circuit breaker is closed, the current flowing therethrough and through the relay winding is insufficient to maintain the relay in the operated condition. As a result, the torque motor is deenergized. Sufficient current, however, continues to flow through the winding on the core to hold the armature in engagement therewith. The circuit breaker is thus held in the closed position as long as the winding on the core remains energized. As soon as this winding is deenergized, the armature is no longer attracted to the core, and the movable contact members of the circuit breaker are released for operation to the open position.

Generally speaking, the armature and core, and the winding thereon perform three functions. As the movable contact members approach the closed position, the attraction of the armature to the core is sufficient to effect the final movement thereof, and thus the torque motor is relieved of operating them to the final position. It is, therefore, unnecessary to provide an exact control for the time when the torque motor is deenergized. The second function that is performed is the holding of the circuit breaker in the closed position until the winding on the core is deenergized. The third function is the deenergization of the relay winding to such an extent that its contact members are opened to disconnect the torque motor from its energizing source. It will now be obvious that I have provided a simple and efficient means for controlling the functioning of a circuit interrupter which does not depend for its operation upon the opening of carefully positioned limit switches and the functioning of mechanical latches to deenergize the circuit breaker operating mechanism and to hold it in the closed position.

Since the details of construction of the torque motor and its application to a circuit breaker mechanism are illustrated and described in the application referred to hereinbefore, they will not be set forth herein.

When it is desired to insure a continuity of power on a load circuit, it is customary to provide an alternate or emergency power circuit in addition to the main or normal power circuit and to provide the necessary switching devices for automatically transferring the load circuit from one power supply to the other as the case may be. The auxiliary or emergency supply circuit may form a part of a single generating system, and it may be so arranged that it would be unaffected by the occurrence of a fault on the main power circuit. Again, the auxiliary power circuit may be energized from an entirely separate source of power for the purpose of insuring the highest degree of reliability.

For the purposes of description, the alternate power circuit is described as an emergency or auxiliary power circuit. However, this circuit may be employed to supply other loads during the normal course of operation. In like manner, the main or normal power circuit may also be employed to supply other loads than the particular load under consideration which may be supplied from either power circuit. On the failure of power on either of these circuits, it may be desirable to provide for so operating the transfer switching equipment that either circuit may be energized from the other one so that all of the load circuits connected thereto may be energized. For this purpose I have provided the circuit arrangement and system that is disclosed diagrammatically in Figure 1 of the drawings.

As shown in this figure, a preferred power circuit, shown generally at 95, is provided comprising a neutral conductor N and line conductors A, B and C. While a three phase four-wire system is illustrated herein, it will be understood that other types of systems come within the scope of my invention. The preferred power circuit is connected by a circuit breaker 96 to a polyphase generator 97 which is arranged to generate a commercial frequency, such as 60 cycles. A load circuit 98 is arranged to be energized from the preferred power circuit 95 on operation of a circuit breaker 99.

The auxiliary power circuit, shown generally at 101, and comprising a neutral conductor N' and line conductors A', B' and C', may be connected for energization by a circuit breaker 102 to a polyphase generator 103 that may be similar in its operating characteristics to the generator 97. A load circuit, shown generally at 104, may be energized by a circuit breaker 105 from the auxiliary power circuit 101.

The reference character 106 designates, generally, a common load circuit comprising a neutral conductor N" and line conductors A", B" and C" which are arranged to be connected to the corresponding conductors of the preferred power circuit 95, or of the auxiliary power system 101 by the operation of circuit breakers 107 and 108.

The circuit breakers 96, 99, 102 and 105 may be of the type disclosed in the application referred to hereinbefore, or they may be of any other suitable type, well known to those skilled in the art.

Under normal operating conditions, the common load circuit 106 will be energized from the preferred power circuit 95 as energized by the generator 97. For this purpose the circuit breakers 96 and 107 will be closed. In addition, the load circuit 98 will be energized when the circuit breaker 99 is closed. The load circuit 104 will be energized from the auxiliary power circuit 101 when the circuit breakers 102 and 105 are closed.

Assuming now that some fault occurs in the generator 97 or the circuits connected thereto that may be cleared by opening the circuit breaker 96, the preferred power circuit 95 will be deenergized and the circuit breaker 107 will be automatically opened and the circuit breaker 108 will be automatically closed to transfer the common load circuit 106 for energization to the auxiliary power circuit 101. If no further operation takes place, the load circuit 98 will be deenergized because of the deenergization of the preferred power circuit 95. However, if means are provided for closing the circuit breaker 107, which forms a part of the automatic transfer system, this load circuit 98 can still be energized, in this case, from the generator 103. In like manner, on failure of the generator 103, the circuit breaker 108 may be operated to maintain power on the auxiliary power circuit 101 and to energize the load circuit 104. Thus, it will be observed that the transfer system may be arranged to serve a dual purpose; first, to maintain power on the common load circuit 106, and second, to maintain the load circuits connected to the preferred and auxiliary power circuits energized under certain operating conditions. It will be understood that the first function will be performed automatically while the latter function will be performed under manual control, since it is undesirable to interconnect the preferred and auxiliary power circuits when both of the generators 97 and 103 are operating because of the necessity of synchronizing them. However, as is well known to those skilled in the art, suitable synchronizing apparatus may be provided so that the generators 97 and 103 may be interconnected by operation of the circuit breakers 107 and 108, which form a part of the automatic transfer system. The control circuits for effecting the foregoing described operation of the circuit breakers 107 and 108 are illustrated in detail in Figure 2 of the drawings.

In this figure I have illustrated the circuit breakers 107 and 108 in diagrammatic form, together with the operating mechanism therefor. The circuit breaker 107 is arranged to be closed by a series motor 68 having an armature 68A and a series field winding 68F. In like manner, the circuit breaker 108 is arranged to be operated to the closed position by a series motor 68' having an armature 68'A and a field winding 68'F. The motors 68 and 68' are arranged to be energized from power transformers 110 and 111 having primary windings 112 and 113 that are connected respectively for energization between the neutral conductor and one of the line conductors of the preferred and auxiliary power circuits 95 and 101. The secondary windings 114 and 115 of these transformers are commonly connected to a control bus 116, while the other terminals are connected to control busses 118 and 119. In one commercial embodiment of my invention, the secondary windings 114 and 115 are arranged to supply a control voltage of 220 volts. Of course other control voltages may be employed if desired.

In order to effect the connection of the motor 68 to the conductors 116 and 118, a control relay 120 is provided having an operating winding 120w and make contact members 120a. In like manner, a control relay 121 is provided for effecting the energization of the motor 68'. This relay is provided with an operating winding 121w and make contact members 121a. Single pole double throw switches 122 and 123 are provided for selectively connecting the motors 68 and 68' for energization to the control busses 118 and 119. When the switch 122 is operated to its upper position, the motor 68 will be energized from the conductors 116 and 118. When it is operated to its lower position, the motor 68 will be energized through conductors 124 from the conductors 116 and 119. Likewise, when the switch 123 is operated to its lower position, the motor 68' will be energized through conductor 125 from conductors 118 and 116.

With a view to interlocking the circuit breakers 107 and 108 for the purpose of preventing simultaneous operation thereof, auxiliary break contact members 107a and 108a are arranged to be operated therewith. When the circuit breakers 107 and 108 are in the open positions, these contact members are closed. However, on operation of one of these circuit breakers to the closed position, its auxiliary contact members are opened and the control circuit for effecting the energization of the other circuit breaker is normally held open.

As has been indicated hereinbefore, it is desirable to provide for automatically transferring the load circuit 106 from the preferred power circuit 95 to the auxiliary power circuit 101 in the event of a fault occurring on the preferred power circuit. This fault will ordinarily be of the nature of a loss of power on one or more of the phases. For the purpose of detecting the failure of voltage on one or more of the phases of the preferred power circuit 95, voltage relays 128, 129 and 130 are provided, each of which is individual to one of the phases, as indicated. Each of the voltage relays is provided with break contact members 128a, 129a and 130a which are connected in parallel circuit relation for a purpose which will be apparent hereinafter. These relays are also provided with make contact members 128b, 129b and 130b. These contact members are connected in series circuit relation for a purpose which will also be set forth hereinafter. Operating windings 128w, 129w and 130w are provided which are connected for individual energization to the secondary windings 132, 133 and 134 of potential transformers 136, 137 and 138, the primary windings 140, 141 and 142 of which are commonly connected for energization to the neutral conductor N and for individual energization from the line conductors A, B and C, as illustrated.

While voltage relays 128, 129 and 130 have been illustrated for connection to the preferred power circuit 95, it will be understood that a similar set of voltage relays may be provided and connected to the auxiliary power circuit 101 for the purpose of making this the preferred power circuit, if such operation is desired. However, since the illustration of these connections would mean merely a duplication of the connections already illustrated and described, and, further, since the connection thereof will be apparent to those skilled in the art, this additional feature has not been shown in detail herein.

For the purpose of interconnecting the preferred and auxiliary power circuits 95 and 101, control switches 144 and 145 are provided. When these switches are closed, as will be described hereinafter, the system will function as set forth hereinbefore in connection with the description of the circuit illustrated in Figure 1 of the drawings.

Figure 2:
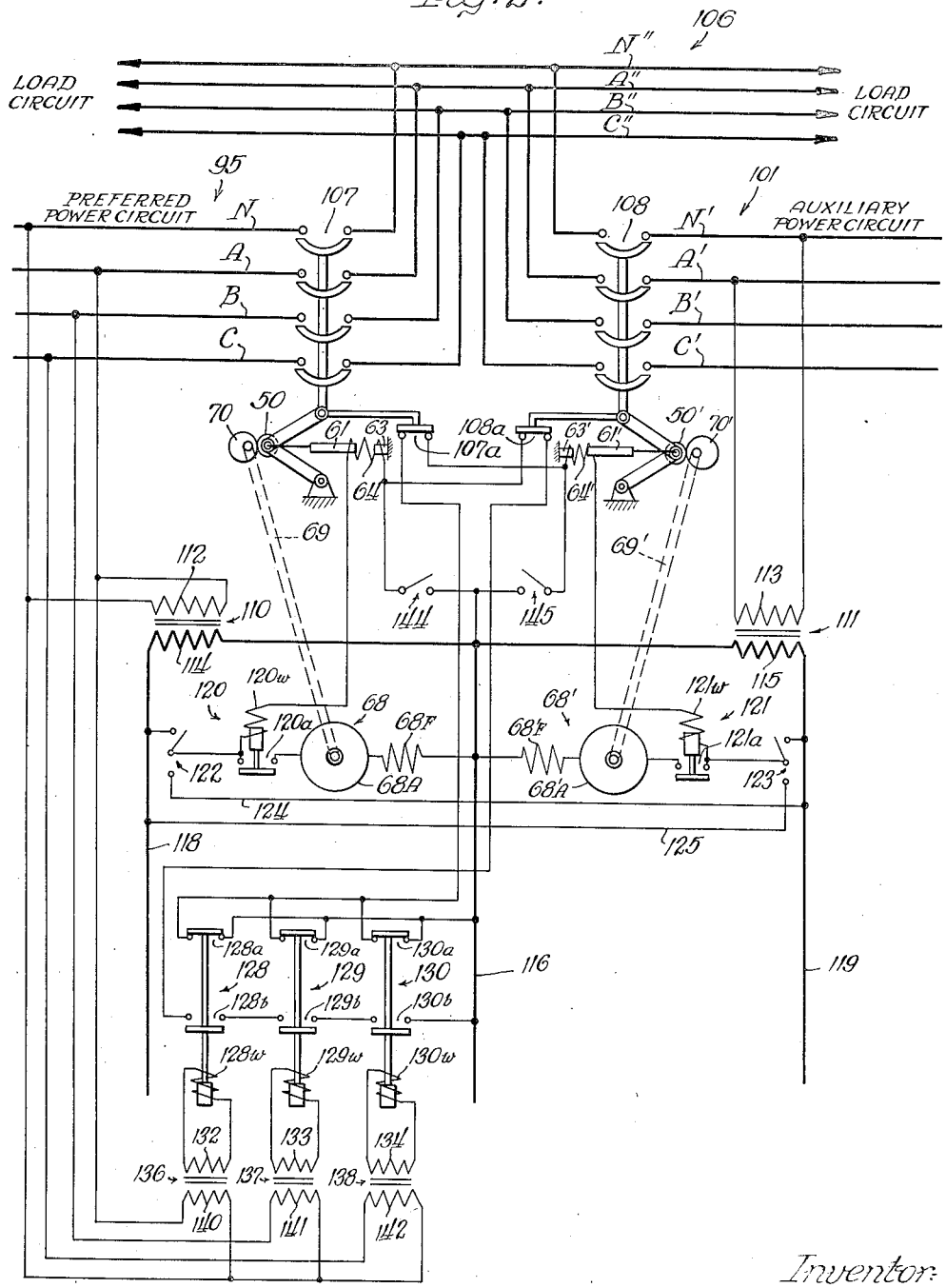
Figure 2 illustrates, diagrammatically, the circuit connections that may be employed in practicing my invention in conjunction with the circuit diagram shown in Figure 1.

In describing the operation of the transfer system shown in Figure 2, it will be assumed that the preferred and auxiliary power circuits 95 and 101 are energized, and that the switches 122 and 123 are operated to their upper positions. It will also be assumed that the control switches 144 and 145 are in the open positions. Under these operating conditions, the windings of the voltage relays 128, 129 and 130 will be energized, thereby closing the make contact members 128b, 129b and 130b. The operating winding of the control relay 120 will then be energized to connect the motor 68 for energization across the control bus represented by the conductors 118 and 116 by the closure of contact members 120a.

The circuit for energizing the operating winding 120w of the control relay 120 may be traced from the energized conductor 118 through the switch 122, operating winding 120w, holding winding 64, break contact members 108a of the circuit breaker 108, and series connected contact members 128b, 129b and 130b to the energized conductor 116.

The armature 61 is moved toward the holding winding 64 when the motor 68 rotates the cam 70 to operate the toggle linkage by engagement with the roller 50. When the circuit breaker 107 is in the open position and the armature 61 is at its furthest position from the winding 64, the impedance of this winding will be a minimum, and consequently sufficient current will flow through it to energize the operating winding 120w of the control relay 120 and close the contact members 120a. As the circuit breaker 107 reaches the closed position, the impedance of the holding winding 64 gradually increases because of the movement of the armature 61. On engagement of the armature 61 with the core 63, the impedance of the holding winding 64 increases to a much higher value, and consequently there is a decrease in the current flowing through it and through the series connected operating winding 120w of the control relay 120. While current still continues to flow through the winding 120w, it is not sufficient to hold the contact members 120a closed and, as a result, the motor 68 is deenergized. The control relay 120 is so constructed that a diminution in energizing current of 50% of the initial value will cause the contact members 120a to be opened. The variation in impedance of the holding winding 64 is such as to cause a decrease in the current flow therethrough of approximately 90% of the initial value. While the necessary change in its impedance is of the order of 1 to 2 to effect the deenergization of the control relay 120 to the necessary extent, it actually changes in the ratio of 1 to 10. These figures are taken from a commercial embodiment of my invention, but it will be understood that other ratios may be employed without departing from the scope of my invention.

As the armature 61 approaches the winding 64, sufficient force is exerted on the toggle linkage, as set forth hereinbefore, to effect the final closure of the circuit breaker 107. Therefore it is unnecessary to adjust with a high degree of accuracy the functioning of the control relay 120 in opening the energizing circuit for the motor 68. Furthermore, because of the arrangement and construction of the linkage between the armature 61 and the circuit breaker 107, only a very slight force need be exerted to hold it in the closed position. This force is provided by the greatly diminished current still flowing through the holding winding 64, as will be readily understood.

Since the holding winding 64 is energized from the preferred power circuit 95, it inherently operates as an undervoltage device that will automatically release the circuit breaker 107 for movement to the open position on decrease in voltage on the preferred power circuit 95 to a predetermined value. For the particular circuit connection shown, a decrease in voltage between the line conductor A and the neutral conductor N to a predetermined value will effect a sufficient deenergization of the holding winding 64 as to release the circuit breaker 107. While this control is not as sensitive as that which is provided by the voltage relays 128, 129 and 130, still use may be made of it if desired.

Assuming now that the voltage fails on one or more of the line conductors of the preferred power circuit 95, for example the line conductor B, the operating winding 129w of the voltage relay 129 will be deenergized, opening make contact members 129b and closing break contact members 129a. The previously traced energizing circuit for the holding winding 64 and the operating winding 120w of the control relay 120 will then be opened at contact members 129b and the circuit breaker 107 will be released for movement to the open position. At the same time at contact members 129a a circuit will be completed for effecting the energization of the operating winding 121w of the control relay 121 to complete an energizing circuit at its make contact members 121a for connecting the motor 68' for energization across the control bus comprising the conductors 116 and 119.

This circuit may be traced from the energized conductor 116 through contact members 129a, auxiliary contact members 107a, which will be closed when the circuit breaker 107 is operated to the open position, holding winding 64', operating winding 121w, and switch 123, to the energized conductor 119.

The circuit breaker 108 will be closed by the motor 68' in a manner similar to that described for the closure of the circuit breaker 107. In like manner, the current flowing through the operating winding 121w will be decreased as the circuit breaker 108 approaches the closed position, and the motor 68' will be deenergized. The circuit breaker 108 will be held in the closed position by the continued energization of the holding winding 64', even though the current flow therethrough is reduced to the minimum normal value.

It will now be obvious that as long as the circuit breaker 107 remains in the closed position, the previously traced circuit for effecting the closure of the circuit breaker 108 cannot be completed because the auxiliary contact members 107a are open. In like manner, as long as the circuit breaker 108 remains in the closed position, its auxiliary contact member 108a is open and the automatic operation of the circuit breaker 107 is prevented.

Assuming now that the line conductor B of the preferred power circuit 95 is again energized with the required voltage, the voltage relay 129 will be operated to open at contact members 129a the energizing circuit for the holding winding 64', and the circuit breaker 108 will be released for movement to the open position. At contact members 129b a circuit will be completed, as previously traced, for again effecting the operation of the circuit breaker 107 to connect the load circuit 106 for energization to the preferred power circuit 95.

If it is desired to effect the simultaneous operation of both of the circuit breakers 107 and 108, one or the other of the switches 144 or 145 may be closed, depending upon which one of the circuit breakers is already closed. Assuming that the circuit breaker 107 is closed and it is desired to close the circuit breaker 108, the switch 145 is closed to connect the holding winding 64' and the operating winding 121w of the control relay 121 for energization directly across the control bus formed by the conductors 116 and 119. This circuit is obvious and will not be traced. The closure of the circuit breaker 108 will take place as described hereinbefore.

In like manner, if the circuit breaker 108 is closed and it is desired to close the circuit breaker 107, the switch 144 may be closed. A circuit is then completed for directly energizing the operating winding 120w of the control relay 120 and the holding winding 64 from the conductors 118 and 116, thereby shunting the auxiliary contact members 108a of the circuit breaker 108 and the make contact members of the voltage relays 128, 129 and 130.

It will now be apparent that when the holding winding 64, operating as a variable impedance device in conjunction with the armature 61, is used, no provision need be made for opening contact members when the circuit breaker controlled thereby reaches the closed position. It is unnecessary to take into consideration the effect of jars and vibrations on such contact members that are set up when the circuit breaker is closed. Moreover, it is unnecessary to provide complicated latch mechanisms that may be likewise affected by the shocks and jars, since the holding winding 64 operates not only as a cut-off mechanism but also as a holding mechanism, and at the same time it provides an added force for effecting the final closure of the circuit breaker associated therewith.

Figure 3:
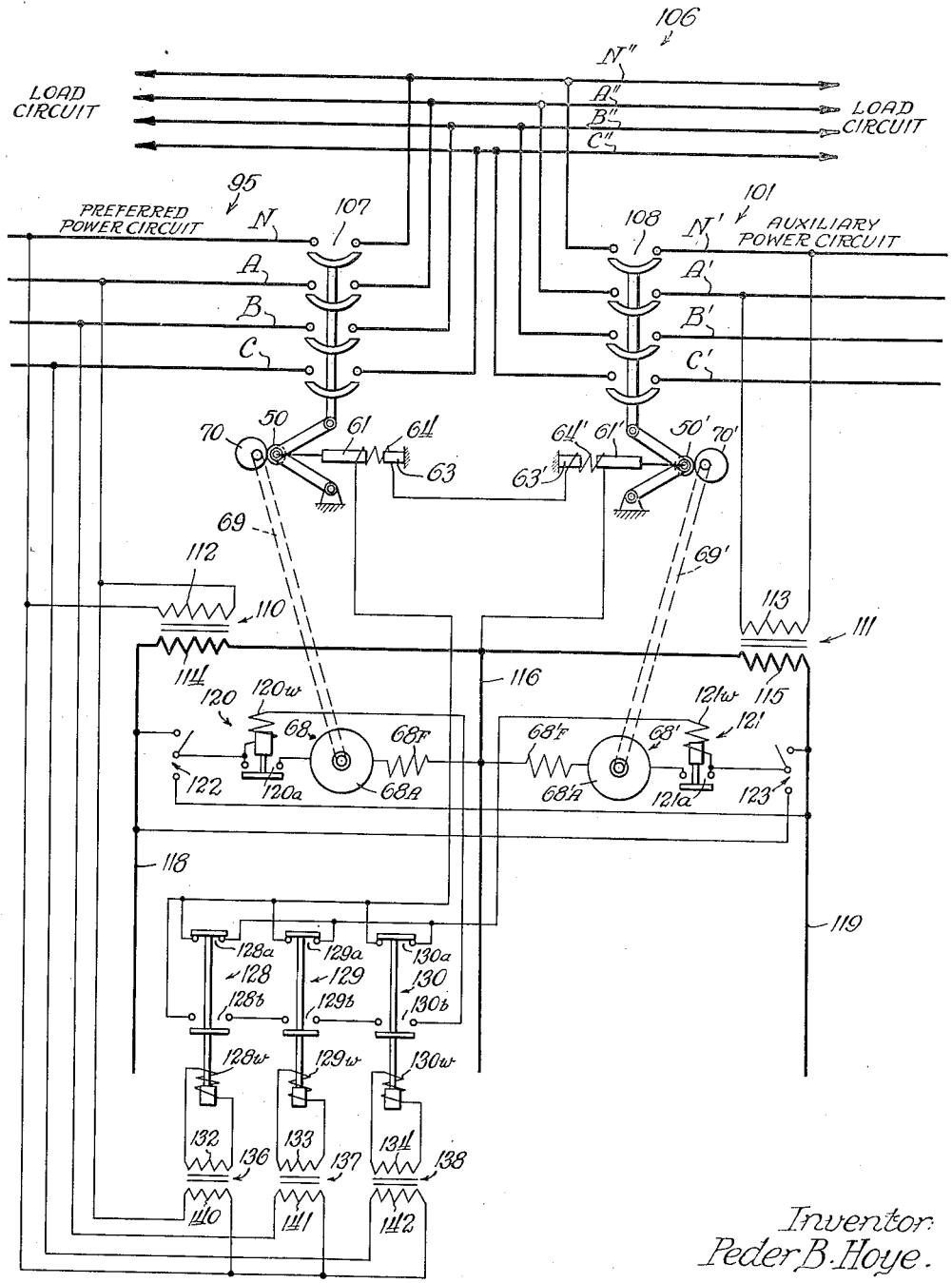
Figure 3 illustrates, diagrammatically, a modified circuit arrangement for controlling the transfer system which may be employed in lieu of the circuit connections shown in Figure 2.

In Figure 3 of the drawings I have illustrated a modified circuit arrangement to provide the interlocking feature between the circuit breakers 107 and 108 without requiring the use of the auxiliary switches 107a and 108a. The interlocking feature is obtained by connecting the holding windings 64 and 64' in series circuit relation. The remaining circuit connections may be identical with those shown in Figure 2, except for the provision of the control switches 144 and 145.

In operation, assuming that the circuit breaker 107 has been closed, the impedance of the holding winding 64 will be so great that sufficient current would not be permitted to flow through the operating winding 121w of the control relay 121 to effect the energization of the motor 68'. In like manner, if the circuit breaker 108 is in the closed position, the impedance of the holding winding 64' is so high that sufficient current would not be permitted to flow through the operating winding 120w of the control relay 120 to effect the energization of the motor 68. The automatic transfer of the common load circuit 196 from the preferred power circuit 95 to the auxiliary power circuit 101 on the occurrence of a fault on the preferred circuit will take place as described hereinbefore, as well as the re-transfer to the preferred power circuit on removal of the fault therefrom.

Since it is obvious that certain further changes may be made in the above arrangements and different embodiments of the invention may be made without departing from the scope thereof, it is intended that all matter contained in the foregoing description or shown in the accompanying drawings shall be interpreted as illustrative and not in a limiting sense.

I claim as my invention:

1. An electric power system comprising, in combination, a first power source, a second power source, a first power circuit energized by said first power source, a second power circuit energized by said second power source, a first load circuit energized from said first power circuit, a second load circuit energized from said second power circuit, a common load circuit, circuit breaker means for automatically transferring said common load circuit from said first power circuit to said second power circuit on the occurrence of a fault in the former, and means for controlling said circuit breaker means to interconnect said first and second power circuits whereby all of said load circuits are energizable from either said first power source or said second power source.

2. An electric power system comprising, in combination, a first power source, a second power source, a first power circuit energized by said first power source, a second power circuit energized by said second power source, a first load circuit energized from said first power circuit, a second load circuit energized from said second power circuit, a common load circuit, a pair of circuit breakers connected to said common load circuit, one of said circuit breakers being connected to said first power circuit and the other being connected to said second power circuit, means for automatically operating said circuit breakers to connect said common load circuit for energization to said second power circuit on the occurrence of a fault on said first power circuit and for automatically restoring said circuit breakers to the normal condition when said fault is removed, and manual means for effecting the operation of both said circuit breakers to the closed position whereby said power circuits are interconnected and said load circuits are energizable from either said first power source or said second power source.

3. In a system for automatically transferring a load circuit from a preferred power circuit to an auxiliary power circuit, in combination, a circuit breaker individual to each power circuit for connecting it to said load circuit, operating means for each circuit breaker, means for energizing said operating means from an electric power source, variable impedance means individual to each circuit breaker and operating together therewith for effecting the deenergization of the operating means individual thereto when the circuit breaker operated thereby is in the closed position, means for normally maintaining the circuit breaker individual to said preferred power circuit closed, and means for automatically effecting the opening of said last named circuit breaker and the closure of the other circuit breaker on the occurrence of a fault on said preferred power circuit.

4. In a system for automatically transferring a load circuit from a preferred power circuit to an auxiliary power circuit, in combination, a circuit breaker individual to each power circuit for connecting it to said load circuit, operating means for each circuit breaker, means for energizing said operating means from an electric power source, variable impedance means individual to each circuit breaker and operating together therewith for effecting the deenergization of the operating means individual thereto when the circuit breaker operated thereby is in the closed position, means controlled by said variable impedance means for holding said circuit breakers in the closed position, means for normally maintaining the circuit breaker individual to said preferred power circuit closed, and means for automatically effecting the opening of said last named circuit breaker and the closure of the other circuit breaker on the occurrence of a fault on said preferred power circuit.

5. A system for automatically transferring a load circuit from a preferred alternating current power circuit to an auxiliary alternating current power circuit comprising, in combination, a circuit breaker individual to each power circuit for connecting it to said load circuit, a motor individual to each circuit breaker, linkage means operatively interconnecting each motor and its circuit breaker, a control relay for each motor and a winding therefor, an armature connected to each linkage means and movable therewith, a core disposed in cooperative relation with each armature, a holding winding on each core, auxiliary contact means operable with each circuit breaker and disposed to be closed only when the circuit breakers are open, circuit means connecting the relay winding and holding winding of each circuit breaker in series circuit relation and in series circuit relation with the auxiliary contact means of the other circuit breaker, relay means disposed to be energized from said preferred power circuit, contact means controlled by said relay means for normally connecting the circuit including the relay and holding windings individual to the preferred circuit breaker for energization to said preferred power circuit, and additional contact means controlled by said relay means for connecting the circuit including the relay and holding windings individual to the auxiliary circuit breaker for energization to said auxiliary power circuit on the occurrence of a fault on said preferred power circuit.

6. A system for automatically transferring a load circuit from a preferred polyphase alternating current power circuit to an auxiliary polyphase alternating current power circuit comprising, in combination, a circuit breaker individual to each power circuit for connecting it to said load circuit, a motor individual to each circuit breaker, linkage means operatively interconnecting each motor and its circuit breaker, a control relay for each motor and a winding therefor, an armature connected to each linkage means and movable therewith, a core disposed in cooperative relation with each armature, a holding winding on each core, auxiliary contact means operable with each circuit breaker and disposed to be closed only when the circuit breakers are open, circuit means connecting the relay winding and holding winding of each circuit breaker in series circuit relation with the auxiliary contact means of the other circuit breaker, a voltage relay individual to each phase of said preferred power circuit, and make and break contact means on each voltage relay, the make contact members on said relays being connected in series circuit relation and to normally connect the circuit including the relay and holding windings individual to the preferred circuit breaker for energization to said preferred power circuit, the break contact members on said relays being connected in parallel circuit relation and to connect the circuit including the relay and holding windings individual to the auxiliary power circuit for energization to said auxiliary power circuit on the failure of one or more of the phases of said preferred power circuit.

7. In a system for automatically transferring a load circuit from a preferred power circuit to an auxiliary power circuit, in combination, circuit breaker means for selectively connecting said load circuit to either of said power circuits, operating means for said circuit breaker means, control means for said operating means, and variable impedance means operable in accordance with the movement of said circuit breaker means and cooperating with said control means for preventing the connection of said load circuit to one of said power circuits while it is connected to the other power circuit.

8. In a system for automatically transferring a load circuit from a preferred power circuit to an auxiliary power circuit, in combination, a circuit breaker individual to each power circuit for connecting it to said load circuit, operating means for each circuit breaker, control means for each operating means, and variable impedance means individual to each circuit breaker and operable in accordance with the movement thereof and cooperating with the control means of the other circuit breaker for preventing simultaneous operation of said circuit breakers.

9. A system for automatically transferring a load circuit from a preferred power circuit to an auxiliary power circuit comprising, in combination, a circuit breaker individual to each power circuit for connecting it to said load circuit, operating means for each circuit breaker, control means for individually effecting the energization of each operating means, variable impedance means individual to each circuit breaker and operable in accordance with the movement thereof, means controlled by each variable impedance means for holding said circuit breakers closed, and circuit means interconnecting each control means with both said variable impedance means whereby the operating means individual to the closed circuit breaker is deenergized on closure thereof and the control means individual to the other circuit breaker is prevented from functioning.

10. A system for automatically transferring a load circuit from a preferred alternating current power circuit to an auxiliary alternating current power circuit comprising, in combination, a circuit breaker individual to each power circuit for connecting it to said load circuit, a motor individual to each circuit breaker, linkage means operatively interconnecting each motor and its circuit breaker, a control relay for each motor and a winding therefor, an armature connected to each linkage means and movable therewith, a core disposed in cooperative relation with each armature, a holding winding on each core, series means connecting said holding windings in series circuit relation, relay means disposed to be energized from said preferred power circuit, contact means controlled by said relay means for normally connecting the relay winding individual to the preferred power circuit in series circuit relation with said holding windings and for energization to said preferred power circuit, and additional contact means controlled by said relay means for connecting the relay winding individual to the auxiliary power circuit in series circuit relation with said holding windings and for energization to said auxiliary power circuit on the occurrence of a fault on said preferred power circuit.

PEDER B. HOYE.